(12) United States Patent
Willems

(10) Patent No.: US 9,397,545 B2
(45) Date of Patent: Jul. 19, 2016

(54) ELECTRIC DAMPER FOR A MOTOR VEHICLE

(71) Applicant: AUDI AG, Ingolstadt (DE)

(72) Inventor: Marco Willems, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/436,751

(22) PCT Filed: Sep. 20, 2013

(86) PCT No.: PCT/EP2013/002834
§ 371 (c)(1),
(2) Date: Apr. 17, 2015

(87) PCT Pub. No.: WO2014/060062
PCT Pub. Date: Apr. 24, 2014

(65) Prior Publication Data
US 2016/0172956 A1 Jun. 16, 2016

(30) Foreign Application Priority Data

Oct. 18, 2012 (DE) .......................... 10 2012 020 436

(51) Int. Cl.
*F16F 9/12* (2006.01)
*H02K 49/10* (2006.01)
(Continued)

(52) U.S. Cl.
CPC .............. *H02K 49/10* (2013.01); *B60G 13/08* (2013.01); *B60G 17/0157* (2013.01); *F16F 9/12* (2013.01); *F16F 15/035* (2013.01)

(58) Field of Classification Search
CPC .... H02K 49/10; B60G 17/0157; B60G 13/08; F16F 15/035; F16F 9/12
See application file for complete search history.

(56) References Cited

U.S. PATENT DOCUMENTS 4,503,952 A * 3/1985 Hesse .................... B60G 13/08
188/264 E
4,982,128 A 1/1991 McDonald
(Continued)

FOREIGN PATENT DOCUMENTS

CN 1462104 12/2003
CN 101621233 1/2010
(Continued)

OTHER PUBLICATIONS

Stölting, H.-D.; Kallenbach, E.; "Handbuch Elektrische Kleinantriebe"; Munich—Vienna: Carl Hanser publishing company; 2002; pp. 13-21; ISBN 3-446-21985-4.
(Continued)

*Primary Examiner* — Faye M Fleming
(74) *Attorney, Agent, or Firm* — Henry M. Feiereisen LLC

(57) ABSTRACT

An electric damper for a motor vehicle for damping a relative movement between two components includes an electric generator for generating an induction voltage, the generator being drivable by the relative movement and having a rotor and a stator. The rotor includes a rotor shaft that is rotationally coupled to at least one rotor disk. A field-generating ring is provided in which elements that can be magnetized in segments are connected to the field-generating means such that the magnetizable elements are polarized alternately over the periphery of the ring. At least one coil ring with coil windings is provided which are arranged in segments, the coil ring and the field-generating ring being concentrically arranged.

8 Claims, 3 Drawing Sheets

(51) Int. Cl.
   *B60G 17/015*   (2006.01)
   *F16F 15/03*   (2006.01)
   *B60G 13/08*   (2006.01)

(56) References Cited

U.S. PATENT DOCUMENTS

| | | | | |
|---|---|---|---|---|
| 5,341,054 | A * | 8/1994 | Tal | B60G 17/0157 310/12.24 |
| 9,065,320 | B2 * | 6/2015 | Liang | H02K 49/043 |
| 2006/0175776 | A1 * | 8/2006 | Christophel | B60G 17/0157 280/6.157 |
| 2010/0207309 | A1 | 8/2010 | Park | |
| 2013/0049508 | A1 | 2/2013 | Willems | |
| 2013/0154277 | A1 | 6/2013 | Willems | |
| 2013/0154404 | A1 | 6/2013 | Willems | |
| 2013/0320791 | A1 | 12/2013 | Willems | |
| 2014/0077646 | A1 * | 3/2014 | Osterberg | H02K 49/106 310/104 |

FOREIGN PATENT DOCUMENTS

| | | |
|---|---|---|
| DE | 3732766 A1 | 4/1988 |
| DE | 40 27 041 | 8/1991 |
| DE | 41 16 160 A1 | 11/1992 |
| DE | 299 09 817 | 12/1999 |
| DE | 10045954 A1 | 3/2002 |
| DE | 10219060 A1 | 11/2003 |
| DE | 102004003730 | 8/2005 |
| DE | 102010008009 A1 | 11/2010 |
| DE | 102010035084 A1 | 2/2012 |
| DE | 102010035088 A1 | 3/2012 |
| EP | 2098390 A1 | 9/2009 |
| EP | 2148407 | 1/2010 |
| GB | 641511 | 2/1948 |
| WO | WO2010/000316 A1 | 1/2010 |
| WO | WO2011/133044 A1 | 10/2011 |

OTHER PUBLICATIONS

International Search Report issued by the European Patent Office in International Application PCT/EP2013/002834.

* cited by examiner

ELECTRIC DAMPER FOR A MOTOR VEHICLE

CROSS-REFERENCES TO RELATED APPLICATIONS

This application is in the U.S. National Stage of International Application No. PCT/EP2013/002834, filed Sep. 20, 2013, which designated the United States and has been published as International Publication No. WO 2014/060062 and which claims the priority of German Patent Application, Serial No. 10 2012 020 436.1, filed Oct. 18, 2012, pursuant to 35 U.S.C. 119(a)-(d).

The invention relates to an electric damper for motor vehicle portending the relative movement between two components according to the preamble of claim 1.

DE 10 2010 035 084 A1 describes an electric damper for a motor vehicle, which damps the relative movement between two components. The electric damper has a housing, wherein a stator is fixed in the housing. A rotor is arranged rotatable relative to the stator, which has field magnets or induction windings. The rotation of the rotor relative to the state or induces a voltage in the induction windings, which decelerates and thereby damps the rotor. The proposed solution in DE 10 2010 035 084 A1 has the disadvantage that for generating a sufficient damping force a high relative speed between the rotor and the stator is required.

In the above reference this problem is solved by providing a transmission between the articulately connected component and the generator. However, using a transmission only allows increasing the rotational speed or the relative speed of the rotation of the rotor only to a limited degree.

SUMMARY OF THE INVENTION

It is an object of the invention to set forth an electric damper for a motor vehicle, which can achieve a sufficient damping also at small excitation amplitudes and a small damper speed.

The object is solved in that the stator has at least two coil rings on which coil windings are segmentally arranged.

The generator also has a stator and a rotor having a rotor shaft, which is fixedly connected with at least one rotor disk.

According to the invention at least one field generating ring of magnetizable elements, in particular a ferromagnetic element, is provided wherein the magnetizable elements are arranged in segments and the elements are connected with a respective end with a field generating means. The north-south orientation of the field generating means is orthogonal to the rotor shaft. The polarity with which the magnetizable elements are provided is selected so that adjoining segments have a different polarity. Further a coil ring is provided which has segmentally circumferential coil windings. The coil ring and the field generating ring are arranged concentric.

In a third embodiment at least two coil rings can be provided, which are arranged concentric relative to the rotor shaft and the ring-shaped arranged field generating means. The coil rings have segmentally circumferential coil windings. The radius of the field generating ring is between the coil circular radii of the two coil rings.

In this way the field generating ring protrudes in axial direction between the two coil rings.

A relative movement between the stator and the rotor results in a relative movement between the field generating ring and the coil rings.

This arrangement causes induction of a voltage in both neighboring coil rings upon rotation of the rotor disk, which in turn generates a magnetic field, which counteracts the rotation of the rotor and thus damps its movement. Due to the simultaneous induction of two coil rings the effective filed change is significantly increased compared to the state-of-the-art.

Further, the coil rings can be arranged on the stator and the magnetizable elements can be arranged on at least one concentric circular circumference on the rotor disk. Further, field generating means are arranged on the rotor disk. They are arranged so that in particular magnetizable elements that oppose each other in radial direction have a different polarity. This can advantageously be achieved by the connection of the magnetizable elements with a respective pole of a field generating means. This allows reducing the number of field generating means. The magnetizable elements can be ferromagnetic elements. Preferably the magnetizable elements are soft magnetic.

Preferably the field generating means radii are situated in radial direction between the coil ring radii.

In a further advantageous embodiment of the invention, at least two field generating rings are provided, which are arranged between three coil rings.

Upon rotation of the coil rings relative to the field generating rings the magnetic field generated by the two neighboring field generating rings acts on the radially intermediate coil ring in the same direction and in this way acts as serial connection.

As a result the damping efficiency is increased while maintaining a compact construction. In a further advantageous embodiment, the field generating means are configured as permanent magnets.

In a further advantageous embodiment of the invention the coil windings of the coil rings are connected with a resistor. Via this resistor a damping can be set. Via a variable resistor this damping can be adjusted in a simple manner. The energy obtained from the damper can advantageously be further used in the vehicle.

A further aspect of the invention relates to a chassis including a chassis control arm and a vehicle superstructure, which are connected to each other by the electric damper described above.

According to an advantageous embodiment, the stator is connected with its housing to the chassis control arm, wherein the rotor shaft, which preferably protrudes on both sides of the stator, is fixedly connected on both sides to a vehicle superstructure. The stator housing can be selected so that it is ideally adjusted to the shape of the control arm eye, thereby causing the movement of the control arm to result in a relative movement between the stator and the rotor shaft. As a result a movement of the chassis control arm relative to the vehicle superstructure is effectively damped.

BRIEF DESCRIPTION OF THE DRAWING

Further advantages, features and possible applications of the present invention will become apparent from the following description in connection with the exemplary embodiments shown in the drawings.

In the description, in the claims and in the drawing the terms and associated reference signs listed in the list of reference signs below are used. In the drawing it is shown in:

DETAILED DESCRIPTION OF PREFERRED EMBODIMENTS

Figure 1:
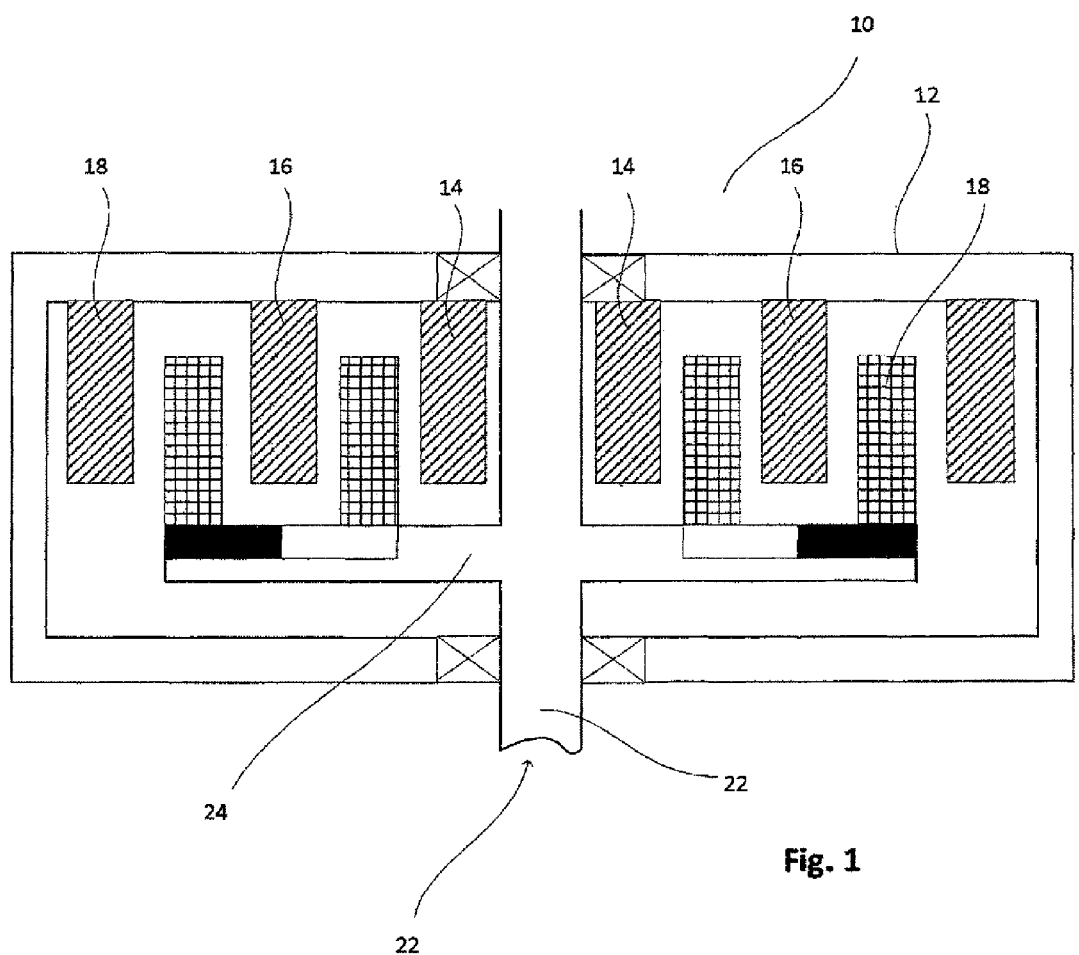
FIG. 1 a schematic view of an electric damper in a first sectional view.

FIG. 1 shows a schematic representation of an electric damper 10 with a housing 12 and a rotor 20, which has a rotor shaft 22 and a rotor disk 24. The rotor 20 is rotatably supported in the housing 12. On the housing 12 a first coil ring 14, a second coil ring 16 and a third coil ring 18 are arranged. The coil rings 14, 16, 18 are arranged concentric relative to the rotor shaft 22 and have different radii. The coil rings 14, 16, 18 are configured so that coil windings 14a, 14b, 14d are introduced segmentally in a ring as symbolically shown in FIG. 2.

In addition the electric damper 10 has soft magnetic rings 26, 28. The soft magnetic rings 26, 28 are configured so that soft magnetic elements 26a, 26b, 26c, 26d are segmentally circumferentially arranged. The two radially neighboring soft magnetic elements are connected with permanent magnets 27 which are introduced in the rotor 20. Because the north-south-orientation of the permanent magnets is orthogonal to the rotor shaft 22, the soft magnets 26a, 26b, 26c, 26d are positioned so that their north-south-orientation is orthogonal to the rotor shaft 22, 52. As a result the connected soft magnets 26a, 26b, 26c, 26d are arranged circumferentially with alternating polarity. This is shown in more detail in FIG. 2. As a result of the rotation of the rotor shaft 22, 52 relative to the housing 12 and the coil rings 14, 16, 18 connected to the housing, a voltage is induced in the coil rings 14, 16, 18, thereby decelerating the rotor 20 and damping the movement of the connected components. By guiding a magnet ring 26, 28 between two coil rings a high degree of damping can be provided while requiring only a small number of permanent magnets.

Figure 2:
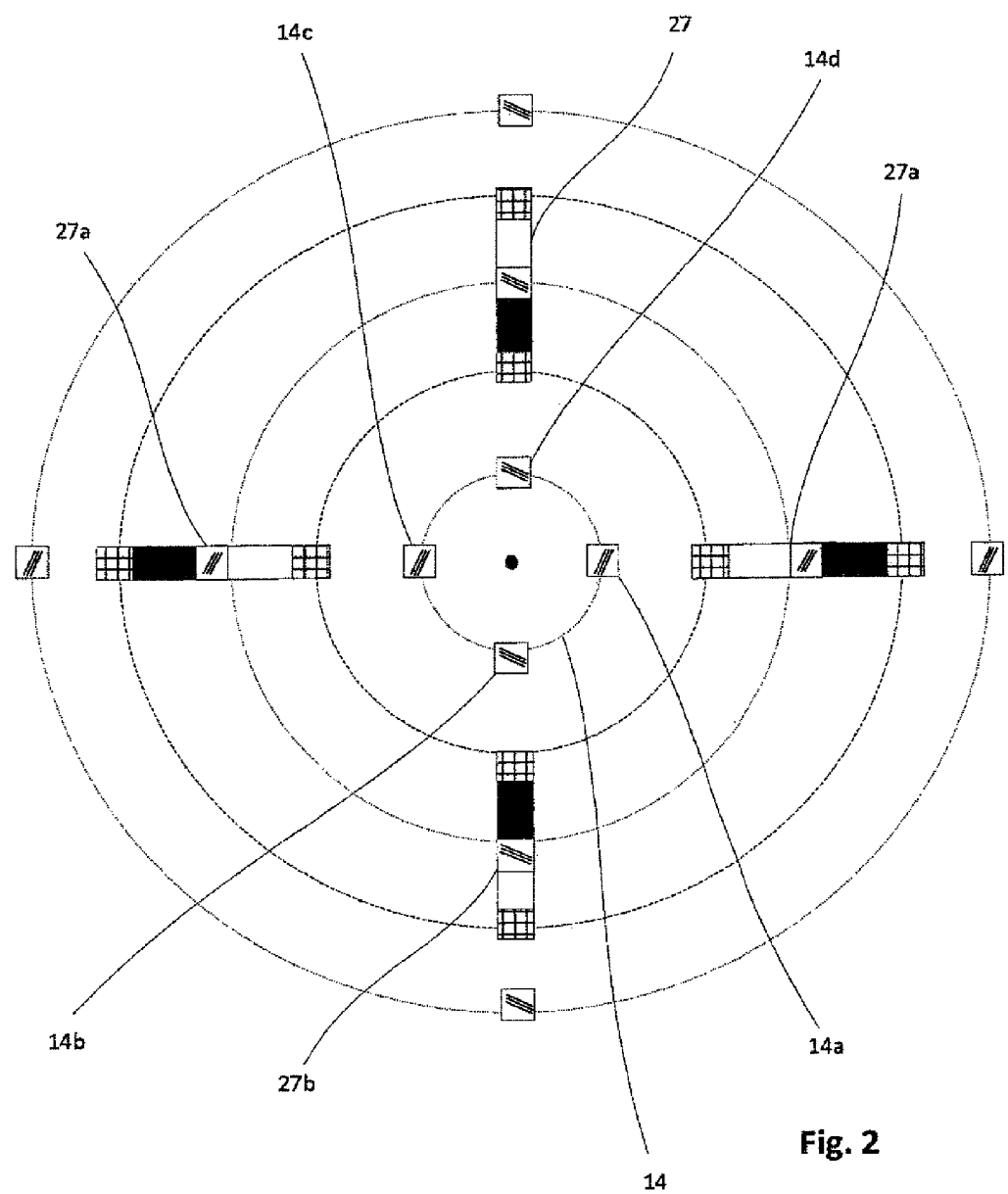
FIG. 2 a schematic view in a second sectional view.

FIG. 2 shows a schematic view of a sectional view.

The concentric arrangement of the coil rings 14, 16, 18 and soft magnet rings 26, 28 about the rotor shaft 22 can be recognized well. In this exemplary embodiment the four coils 14a, 14b, 14c, 14d are arranged in the inner coil ring 14, wherein the individual coils are here shown symbolically. As can be seen in FIG. 1 the cons of the coil rings 14, 16, 8 are connected with the housing 12. The soft magnets 26a, 26b, 26c, 26d are arranged on the rotor disk 24 so as to be rotatable relative to the housing 12. The permanent magnets 27a, 27b, 27c, 27d and the soft magnets 26a, 26b, 26c, 26d are arranged on the soft magnet ring 26 so that their magnetic orientation is orthogonal in radial direction relative to the rotor shaft 22 and their polarity alternates in subsequent segments. The above description regarding the coil ring 14 and the magnet ring 26 also applies to the further outwardly situated coil rings 16, 18 and the soft magnet ring 28. As a result of the arrangement according to the invention high damping values can be achieved by using a small number of permanent magnets also at low rotational speeds. This ensures a cost-effective production of electric dampers.

Figure 3:
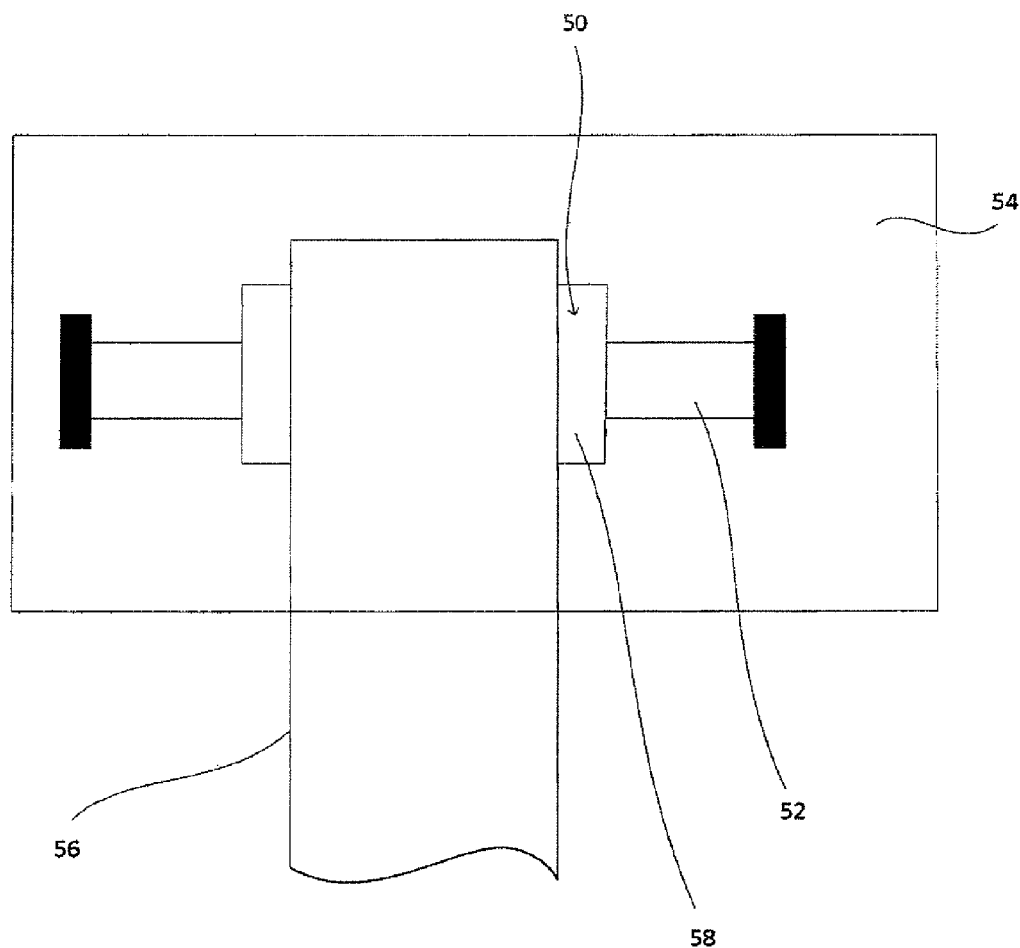
FIG. 3 an arrangement of a generator according to the invention in a vehicle.

FIG. 3 shows the top view onto the coil disk 18 in which the coils 30 are circumferentially arranged in segments. In these coils a voltage is induced when the rotor rotates relative to the stator. The segment size for arranging the coils corresponds to the one of the permanent magnets. The number can be selected depending on the application.

The invention claimed is:

1. An electric damper for a motor vehicle for damping a relative movement between two components comprising:
    an electric generator having a rotor and a stator and being drivable by the relative movement for generating an induction voltage, said rotor having a rotor shaft connected in rotative fixed relationship with at least one rotor disk;
    a field generating ring having magnetizable elements provided segmentally in the field generating ring, said magnetizable elements being connected with field generating means so that the magnetizable elements are circumferentially polarized alternately over a periphery of the field generating ring; and
    at least one coil ring having segmentally arranged coil windings said at least one coil ring and said field generating ring being arranged concentrically.

2. The electric damper of claim 1, wherein two said coil rings are provided, wherein a radius of the field generating ring is situated between radii of the two coil rings, and wherein a relative movement between the rotor and the stator results in a relative movement between the field generating ring and the coil rings.

3. The electric damper of claim 1, wherein the rotor disc carries the field generating means ring.

4. The electric damper of claim 1, comprising at least two said field generating rings arranged concentrically and connected with the rotor shaft in rotative fixed relationship, wherein the field generating means are arranged so that radially adjacent magnetizable elements have respective different polarities.

5. The electric damper of claim 1, wherein the magnetizable element is a magnetizable element of a first field generating ring.

6. The electric damper of claim 1, wherein the field generating means are configured as permanent magnets.

7. The electric damper of claim 1, wherein the connections of the coil windings of the coil disk are connected to a resistor.

8. A chassis, comprising a chassis control arm, a vehicle superstructure and the electric damper of claim 1, wherein the stator is connected with a chassis control arm and the rotor shaft with a vehicle superstructure.

* * * * *